US012774820B2

(12) United States Patent
Zhang et al.

(10) Patent No.: US 12,774,820 B2
(45) Date of Patent: Oct. 27, 2026

(54) AIR PURIFICATION DEVICE AND AIR CONDITIONER

(71) Applicants: GD MIDEA AIR-CONDITIONING EQUIPMENT CO., LTD., Foshan (CN); MIDEA GROUP CO., LTD., Foshan (CN)

(72) Inventors: Zijian Zhang, Foshan (CN); Zhonghua He, Foshan (CN); Yi Ding, Foshan (CN); Ganggang Yang, Foshan (CN)

(73) Assignees: GD MIDEA AIR-CONDITIONING EQUIPMENT CO., LTD., Foshan (CN); MIDEA GROUP CO., LTD, Foshan (CN)

( * ) Notice: Subject to any disclaimer, the term of this patent is extended or adjusted under 35 U.S.C. 154(b) by 440 days.

(21) Appl. No.: 18/276,203

(22) PCT Filed: Apr. 23, 2021

(86) PCT No.: PCT/CN2021/089297
§ 371 (c)(1),
(2) Date: Aug. 7, 2023

(87) PCT Pub. No.: WO2022/165998
PCT Pub. Date: Aug. 11, 2022

(65) Prior Publication Data

US 2024/0125487 A1 Apr. 18, 2024

(30) Foreign Application Priority Data

Feb. 8, 2021 (CN) ......................... 202110184327.9
Feb. 8, 2021 (CN) ......................... 202120373250.5

(51) Int. Cl.
*F24F 1/0353* (2019.01)
*B01D 46/00* (2022.01)
(Continued)

(52) U.S. Cl.
CPC ........ *F24F 1/0353* (2019.02); *B01D 46/0006* (2013.01); *B01D 46/0032* (2013.01);
(Continued)

(58) Field of Classification Search
CPC .......... F24F 13/28; F24F 1/0353; F24F 8/194; F24F 1/035; F24F 8/192; F24F 11/88;
(Continued)

(56) References Cited

U.S. PATENT DOCUMENTS 7,531,141 B2 * 5/2009 Descotes ............... F24F 1/0353 422/177
10,443,888 B2 10/2019 Morioka
10,464,074 B2 * 11/2019 Lee .......................... B03C 3/45

FOREIGN PATENT DOCUMENTS

CN 205641412 U * 10/2016
CN 207694995 U 8/2018
(Continued)

OTHER PUBLICATIONS

The European Patent Office (EPO) Extended Search Report for EP Application No. 21924006.6 Jun. 25, 2024 11 Pages.
(Continued)

*Primary Examiner* — Jennifer Dieterle
*Assistant Examiner* — Sonji Turner
(74) *Attorney, Agent, or Firm* — Anova Law Group, PLLC

(57) ABSTRACT

An air purification device includes a housing having an accommodation cavity, a filter module disposed within the accommodation cavity and provided with a plurality of electrical connectors arranged at intervals in a first direction, and a plurality of power supply elements arranged at intervals at the housing in the first direction and having a one-to-one correspondence with the plurality of electrical connectors. Each of the plurality of power supply elements
(Continued)

is provided with a plurality of power supply contacts each configured to be in contact with one of the plurality of electrical connectors.

20 Claims, 10 Drawing Sheets

(51) Int. Cl.
*B01D 46/42* (2006.01)
*F24F 1/035* (2019.01)
*F24F 8/192* (2021.01)

(52) U.S. Cl.
CPC .......... *B01D 46/4245* (2013.01); *F24F 8/194* (2021.01); *B01D 2265/028* (2013.01); *B01D 2279/50* (2013.01); *F24F 1/035* (2019.02)

(58) Field of Classification Search
CPC . F24F 13/20; F24F 8/10; F24F 1/0073; H01R 4/48; H01R 4/4809; H01R 4/34; H01R 41/00; H01R 13/629; B01D 46/0006; B01D 46/0032; B01D 46/4245; B01D 2265/028; B01D 2279/50; B01D 46/0013; B01D 46/00; B03C 3/66; H01M 50/244; H02M 7/003; H05K 7/1432; H05K 7/06; H05K 5/0217; H01H 1/58
See application file for complete search history.

(56) References Cited

FOREIGN PATENT DOCUMENTS

| | | | | | |
|---|---|---|---|---|---|
| CN | 109028378 | A | | 12/2018 | |
| CN | 109028531 | A | * | 12/2018 | ................ F24F 3/16 |
| CN | 110207284 | A | | 9/2019 | |
| CN | 209697175 | U | | 11/2019 | |
| CN | 111089336 | A | | 5/2020 | |
| CN | 211476119 | U | * | 9/2020 | |
| CN | 111853948 | A | | 10/2020 | |
| CN | 211667910 | U | | 10/2020 | |
| CN | 109028379 | B | * | 11/2021 | ................ F24F 8/10 |
| CN | 214791729 | U | | 11/2021 | |
| JP | 2950943 | B2 | * | 9/1999 | |
| JP | 2006210231 | A | | 8/2006 | |
| WO | 2018234632 | A1 | | 12/2018 | |

OTHER PUBLICATIONS

China National Intellectual Property Administration (CNIPA) Office Action 1 for Application No. 202110184327.9 Oct. 10, 2024 13 Pages (including translation).
World Intellectual Property Organization (WIPO) International Search Report and Written opinion for PCT/CN2021/089297 Oct. 20, 2021 6 Pages (Translation Included).

* cited by examiner

AIR PURIFICATION DEVICE AND AIR CONDITIONER

CROSS-REFERENCE TO RELATED APPLICATIONS

This present application is a National Stage Entry under 35 U.S.C. § 371 of International Application No. PCT/CN2021/089297, filed on Apr. 23, 2021, which claims priority to Chinese Application Nos. 202110184327.9 and 202120373250.5, both filed on Feb. 8, 2021, the entire contents of all of which are incorporated herein by reference.

TECHNICAL FIELD

The present disclosure relates to the field of electrical appliances, and in particular, to an air purification device and an air conditioner.

BACKGROUND

In the related art, a functional filter module in an air purification device achieves power supply in a wiring manner. However, physical wires increase complexity and maintenance costs of the power supply. In addition, the functional filter module has a single mounting position and poor flexibility.

SUMMARY

The present disclosure aims to at least solve one of the technical problems existing in the related art. To this end, embodiments of the present disclosure are to provide an air purification device, which can conveniently supply power to a filter module and achieves a diversified mounting position of the filter module.

Embodiments of the present disclosure further provide an air conditioner having the air purification device as described above.

An air purification device according to embodiments of the present disclosure includes a housing, a filter module, and a plurality of power supply elements. The housing has an accommodation cavity. The filter module is disposed within the accommodation cavity. The filter module is provided with a plurality of electrical connectors arranged at intervals in a first direction. The plurality of power supply elements are arranged at intervals at the housing in the first direction and have a one-to-one correspondence with the plurality of electrical connectors. Each of the plurality of power supply elements is provided with a plurality of power supply contacts adapted to be in contact with the plurality of electrical connectors.

In the air purification device according to the embodiments of the present disclosure, each of the plurality of power supply elements is provided with a plurality of power supply contacts. In this way, when the plurality of electrical connectors are brought into contact with one of the plurality of power supply contacts of the power supply element corresponding to the electrical connector, an electrical connection between the power supply element and the electrical connector can be realized. Therefore, it is possible to allow for diversified mounting positions of the filter module and enhance mounting flexibility of the filter module. In addition, optimization of an internal structure of each of the air purification device and an air conditioner having the air purification device are facilitated. Further, a wire harness can be removed, and wiring complexity can be lowered. Furthermore, later maintenance costs can be reduced.

According to some embodiments of the present disclosure, each power supply element has a plurality of elastic sheets that are elastically deformable. The plurality of elastic sheets are formed as the plurality of power supply contacts and arranged at intervals in a length direction of the power supply element.

According to some embodiments of the present disclosure, each of the plurality of elastic sheets includes a connection member connected to the power supply element, and an elastic member connected to the connection member. The elastic member includes a first elastic section and a second elastic section. The first elastic section has an end connected to the connection member and the other end extending away from the power supply element. The second elastic section has an end connected to the other end of the first elastic section and another end extending towards the power supply element. The other end of the second elastic section is spaced apart from the power supply element.

According to some embodiments of the present disclosure, the air purification device further includes a fixation base. The power supply element is disposed at the fixation base, and the fixation base is connected to the housing.

According to some embodiments of the present disclosure, the fixation base is connected to the housing by a first fastener and/or a snap.

According to some embodiments of the present disclosure, the air purification device further includes a positioning assembly including a positioning hole and a positioning member engaged in the positioning hole. The positioning hole is formed at one of the fixation base and the housing, and the positioning member is disposed at the other of the fixation base and the housing.

According to some embodiments of the present disclosure, the fixation base has a plurality of fixation positions having a one-to-one correspondence with the plurality of power supply elements. Each of the plurality of power supply elements is disposed at one of the plurality of fixation positions.

According to some embodiments of the present disclosure, a plurality of limiting stop sheets are provided at each of the plurality of fixation positions and are arranged at intervals in a length direction of the fixation position. A limiting space is formed between each of the plurality of limiting stop sheets and the fixation base, and each of the plurality of power supply elements is disposed in one limiting space.

According to some embodiments of the present disclosure, each of the plurality of limiting stop sheets includes a first stop member and a second stop member. The first stop member is connected to the fixation base and located on a side of the power supply element in a width direction of the power supply element. The second stop member is connected to the first stop member and opposite to a side surface of the power supply element in a thickness direction of the power supply element.

According to some embodiments of the present disclosure, the air purification device further includes a plurality of limit members arranged at intervals in the length direction of the fixation position. The plurality of limit members and the first stop member are located at two sides of each of the plurality of fixation positions in a width direction of the fixation position, respectively.

According to some embodiments of the present disclosure, the air purification device further includes a first screw. A first electrical connection member is disposed at a power supply element, and the first electrical connection member has a first connection hole formed at the first electrical connection member. The second connection hole is formed at the fixation base and corresponds to the first connection hole. The first screw passes through the first connection hole and the second connection hole. A wire harness electrically connected to a power supply is connected between the first screw and the first electrical connection member.

According to some embodiments of the present disclosure, the power supply element is locked at the fixation base by a second fastener.

According to some embodiments of the present disclosure, the filter module has a mounting hole formed at a side wall of the filter module. Each of the plurality of electrical connectors is disposed in one mounting hole and includes a protrusion opposite to the mounting hole, and a first limit arm and a second limit arm that are connected to two ends of the protrusion. The first limit arm and the second limit arm are adapted to abut against an inner wall surface of the side wall of the filter module.

According to some embodiments of the present disclosure, the air purification device further includes a second screw. A second electrical connection member is disposed at each of the plurality of electrical connectors. The second electrical connection member has a third connection hole. A fourth connection hole is formed at the filter module and corresponds to the third connection hole. The second screw passes through the third connection hole and the fourth connection hole. A wire harness electrically connected to an internal circuit of the filter module is connected between the second screw and the second electrical connection member.

An air conditioner according to embodiments of the present disclosure includes the air purification device as described above.

In the air conditioner according to the embodiments of the present disclosure, by providing the air purification device as described above, each of the plurality of power supply elements is provided with a plurality of power supply contacts. In this way, when the plurality of electrical connectors are brought into contact with one of the plurality of power supply contacts of the power supply element corresponding to the electrical connector, an electrical connection between the power supply element and the electrical connector can be realized. Therefore, it is possible to allow for diversified mounting positions of the filter module and enhance mounting flexibility of the filter module. In addition, optimization of an internal structure of each of the air purification device and an air conditioner having the air purification device are facilitated. Further, a wire harness can be removed, and wiring complexity can be lowered. Furthermore, later maintenance costs can be reduced.

Additional aspects and advantages of the present disclosure will be provided at least in part in the following description, or will become apparent at least in part from the following description, or can be learned from practicing of the present disclosure.

BRIEF DESCRIPTION OF THE DRAWINGS

The above and/or additional aspects and advantages of the present disclosure will become more apparent and more understandable from the following description of embodiments taken in conjunction with the accompanying drawings, in which.

REFERENCE NUMERALS

Figure 1:
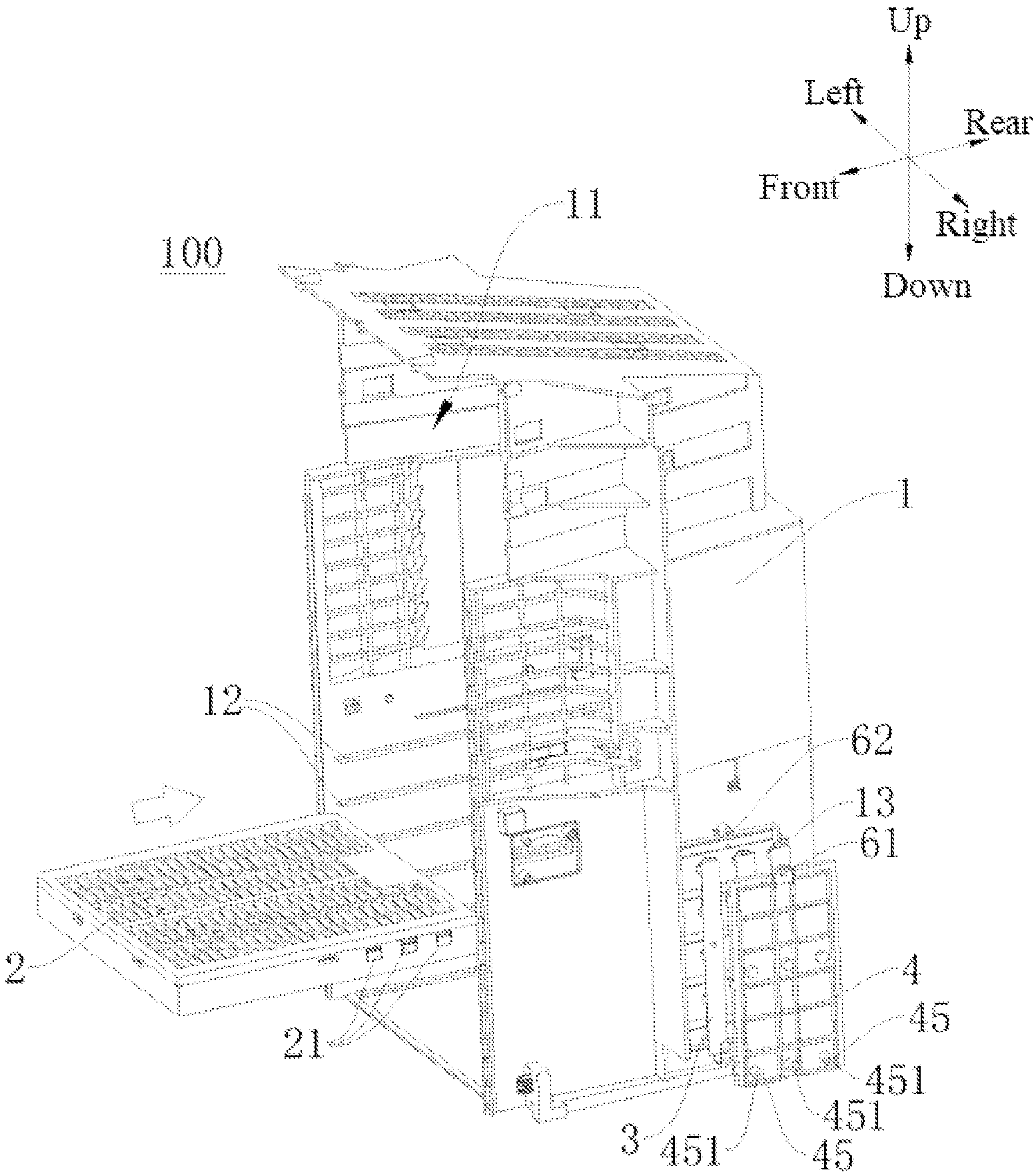
FIG. 1 is an exploded view of an air purification device according to an embodiment of the present disclosure.

100, air purification device;

1, housing; 11, accommodation cavity; 12, support rail; 13, snap;

2, filter module; 21, electrical connector; 211, protrusion; 211*a*, body; 211*b*, first connection section; 211*c*, second connection section; 212, first limit arm; 213, second limit arm; 214, second electrical connection member; 215, third connection hole; 22, mounting hole; 23, second connection post; 231, fourth connection hole;

3, power supply element; 31, power supply contact; 311, connection member; 312, elastic member; 312*a*, first elastic section; 312*b*, second elastic section; 32, first electrical connection member; 33, first connection hole;

4, fixation base; 40, fixation position; 41, fixation lug; 42, support rib; 43, limiting stop sheet; 431, first stop member; 432, second stop member; 44, limit member; 45, first connection post; 451, second connection hole;

51, positioning hole; 52, positioning member;

61, first screw hole; 62, second screw hole; 63, third screw hole; 64, fourth screw hole;

1000, air conditioner;

200, fresh air component; 201, first fan assembly;

300, rear enclosing panel; 400, top cover; 500, air outlet frame; 600, upper panel; 700, lower panel; 800, base; 900, air heat exchanger.

DETAILED DESCRIPTION

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the accompanying drawings are illustrative only, and are intended to explain, rather than limiting the present disclosure.

An air purification device 100 according to embodiments of the present disclosure will be described below with reference to the drawings. The air purification device 100 may be configured to filter dust and the like in the air. The air purification device 100 may be applied in an air conditioner 1000 or the like.

FIG. 1 is an exploded view of an air purification device 100 according to an embodiment of the present disclosure. As illustrated in FIG. 1, the air purification device 100 according to the embodiments of the present disclosure includes a housing 1, a filter module 2, and a plurality of power supply elements 3.

In some embodiments, the housing 1 has an accommodation cavity 11, and the filter module 2 is disposed within the accommodation cavity 11. Referring to FIG. 1, a front side of the accommodation cavity 11 is open, and the filter module 2 may be disposed in the accommodation cavity 11 in a drawable manner. For example, in some embodiments of the present disclosure, a support rail 12 is provided at a side wall of the accommodation cavity 11 and may extend in a front-rear direction. The filter module 2 may be supported on the support rail 12, and is slidable on the support rail 12. Therefore, the filter module 2 may be supported by the support rail 12, enabling a position of the filter module 2 to be stable. Meanwhile, the filter module 2 may be guided by the support rail 12 to avoid deviation during drawing of the filter module 2.

It can be understood that, in other embodiments of the present disclosure, a roller for cooperating with the support rail 12 may also be provided at the filter module 2. Therefore, a friction force between the filter module 2 and the support rail 12 may be reduced, which enables the filter module 2 to be drawn more smoothly.

In some embodiments of the present disclosure, the roller may be made of plastic. The plastic piece is low in cost and light in weight, which facilitates reducing overall costs of the plastic piece and an overall weight of a filter module 2.

In some embodiments of the present disclosure, the filter module 2 includes a filter body and a filter support. A placement space is formed in the filter support, and the filter body is disposed in the placement space. The filter support may be in slidable fit with the support rail 12. In some embodiments, the filter body may include an electrostatic filtration mesh. Further, electrostatic filtration mesh can ionize gas molecules in the air by using a high-voltage direct-current electric field, and charge dust particles and bacteria in the air during movement to allow the dust particles and the bacteria to be adsorbed by an electrode plate in an electrostatic filter module. Therefore, dust, smoke, or the like with a particle size greater than 0.1 microns are filtered.

In the description of embodiments of the present disclosure, it is to be understood that terms such as "length," "width," "thickness," "upper," "lower," "front," "rear," "back," "left," "right," "vertical," "horizontal," "top," "bottom," "inner," and "outer" should be construed to refer to the orientation or the position as described or as shown in the drawings in discussion. These relative terms are only used to simplify the description of the present disclosure, and do not indicate or imply that the device or element referred to must have a particular orientation, or must be constructed or operated in a particular orientation. Thus, these terms cannot be constructed to limit the present disclosure.

Figure 2:
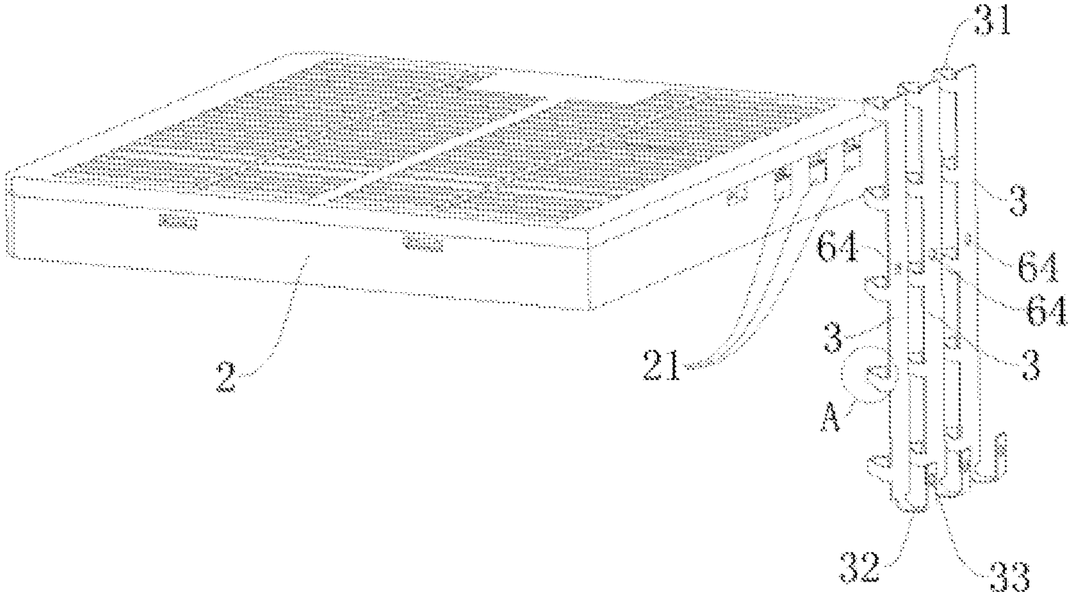
FIG. 2 is an exploded view of a filter module and a power supply element according to an embodiment of the present disclosure.

The filter module 2 is provided with a plurality of electrical connectors 21 arranged at intervals in a first direction. In the description of the present disclosure, "a plurality of" means two or more. The first direction may be a length direction of a side wall of the filter module 2. For example, the first direction may be a front-rear direction or a left-right direction illustrated in FIG. 1. FIG. 2 is an exploded view of the filter module 2 and the power supply element 3 according to an embodiment of the present disclosure. For example, referring to FIG. 2, the plurality of electrical connectors 21 may be disposed at the side wall of the filter module 2 and may be arranged at intervals in the length direction of the side wall of the filter module 2.

A plurality of power supply elements 3 are arranged at the housing 1 at intervals in the first direction. The plurality of power supply elements 3 have a one-to-one correspondence with the plurality of electrical connectors 21. Each of the plurality of power supply elements 3 has a plurality of power supply contacts 31 adapted to be in contact with their corresponding electrical connectors 21. When the plurality of electrical connectors 21 is in contact with one of the plurality of power supply contacts 31 on its corresponding power supply element 3, the power supply element 3 is electrically connected to the electrical connector 21.

The plurality of power supply elements 3 are also arranged at intervals in the length direction of the side wall of the filter module 2. Each of the plurality of power supply elements 3 may be formed into an elongated shape. In this way, the plurality of power supply contacts 31 may be easily formed at each of the plurality of power supply elements 3. As illustrated in FIG. 2, the power supply element 3 may be formed as an elongated sheet structure extending in an up-down direction.

In some embodiments of the present disclosure, the filter module 2 may be provided with three electrical connectors 21 including a positive electrical connector 21, a negative electrical connector 21, and a grounding electrical connector 21. In addition, three power supply elements may be provided, and include a positive power supply element 3, a negative power supply element 3, and a grounding power supply element 3. When the positive electrical connector 21 is in contact with one of the power supply contacts 31 on the positive power supply element 3, the negative electrical connector 21 is in contact with one of the power supply contacts 31 on the negative power supply element 3, and the grounding electrical connector 21 is in contact with one of the power supply contacts 31 on the grounding power supply element 3, power supply to the filter module 2 can be implemented.

In other embodiments of the present disclosure, the filter module 2 may be provided with two electrical connectors 21 including a positive electrical connector 21 and a negative electrical connector 21. In addition, two power supply elements 3 may be provided, and include a positive power supply element 3 and a negative power supply element 3. When the positive electrical connector 21 is in contact with one of the power supply contacts 31 on the positive power supply element 3, and the negative electrical connector 21 is in contact with one of the power supply contacts 31 on the negative power supply element 3, the power supply to the filter module 2 can be implemented.

It can be understood that when the filter module 2 is inserted into the accommodation cavity 11, each of the plurality of electrical connectors 21 is brought into contact with one of the plurality of power supply contacts 31 of the corresponding power supply element 3. In this case, the electrical connector 21 is electrically connected to the power supply element 3. When the filter module 2 is pulled out of the accommodation cavity 11, at least one of the electrical connectors 21 is separated from the power supply contact 31 of the respective power supply element 3. In this case, the electrical connector 21 is disconnected from the power supply element 3, and the filter module 2 is powered off.

In some embodiments of the present disclosure, the filter module 2 is detachably disposed in the accommodation cavity 11. Therefore, cleaning, replacement, or maintenance of the filter module 2 is facilitated.

Since each of the plurality of power supply elements 3 in the present disclosure has the plurality of power supply contacts 31, an electrical connection between the power supply element 3 and the electrical connector 21 can be realized when each of the plurality of electrical connectors 21 is in contact with any power supply contact 31 of the respective power supply element 3. In this way, a mounting position of the filter module 2 may be adjusted as desired, as long as the electrical connector 21 on the filter module 2 can be brought into contact with one of the power supply contacts 31 on the power supply element 3. As a result, the mounting position of the filter module 2 can be more diversified. Further, it is possible to enhance mounting flexibility of the filter module 2 and facilitate optimization of an internal structure of each of the air purification device 100 and the air conditioner 1000 having the air purification device 100.

Referring to FIG. 1, a plurality of mounting positions arranged in a height direction of the accommodation cavity 11 may be provided in the accommodation cavity 11. The plurality of power supply contacts 31 on the power supply element 3 may be arranged in the height direction of the accommodation cavity 11. Therefore, the filter module 2 may be mounted at any mounting position.

It can be understood that except the mounting positions for mounting the filter module 2 in the accommodation cavity 11, filters of other types may be provided in the accommodation cavity 11. For example, a High efficiency particulate air Filter (HEPA) mesh or the like may be provided. The characteristic of the HEPA mesh is that the HEPA mesh allows air to pass therethrough and fine particles not to pass therethrough. Removal efficiency of the HEPA for particles with a diameter of 0.3 microns (1/200 of a diameter of hair) may reach 99.97% or more. As a result, the HEPA mesh is the most effective filter medium for smoke, dust, bacteria, and other pollutants. The HEPA is available in five materials including PP filter paper, glass fiber, composite PP PET filter paper, melt-blown polyester non-woven fabric, and melt-blown glass fiber. The HEPA has the characteristics of great wind resistance, great dust holding capacity, high filtration precision, and the like, may be machined into various sizes and shapes based on customer's demands, and is suitable for different models.

In the air purification device 100 according to the embodiments of the present disclosure, the plurality of power supply contacts 31 are provided at each of the plurality of power supply elements 3. In this way, when each of the plurality of electrical connectors 21 is in contact with any power supply contact 31 on the respective power supply element 3, the electrical connection between the power supply element 3 and the electrical connector 21 can be implemented. Therefore, the mounting position of the filter module 2 can be more diversified, and the mounting flexibility of the filter module 2 can be improved. Further, the optimization of the internal structure of each of the air purification device 100 and the air conditioner 1000 having the air purification device 100 are facilitated. Meanwhile, it is possible to remove a wire harness and lower wiring complexity. In addition, later maintenance costs may be reduced.

Figure 3:
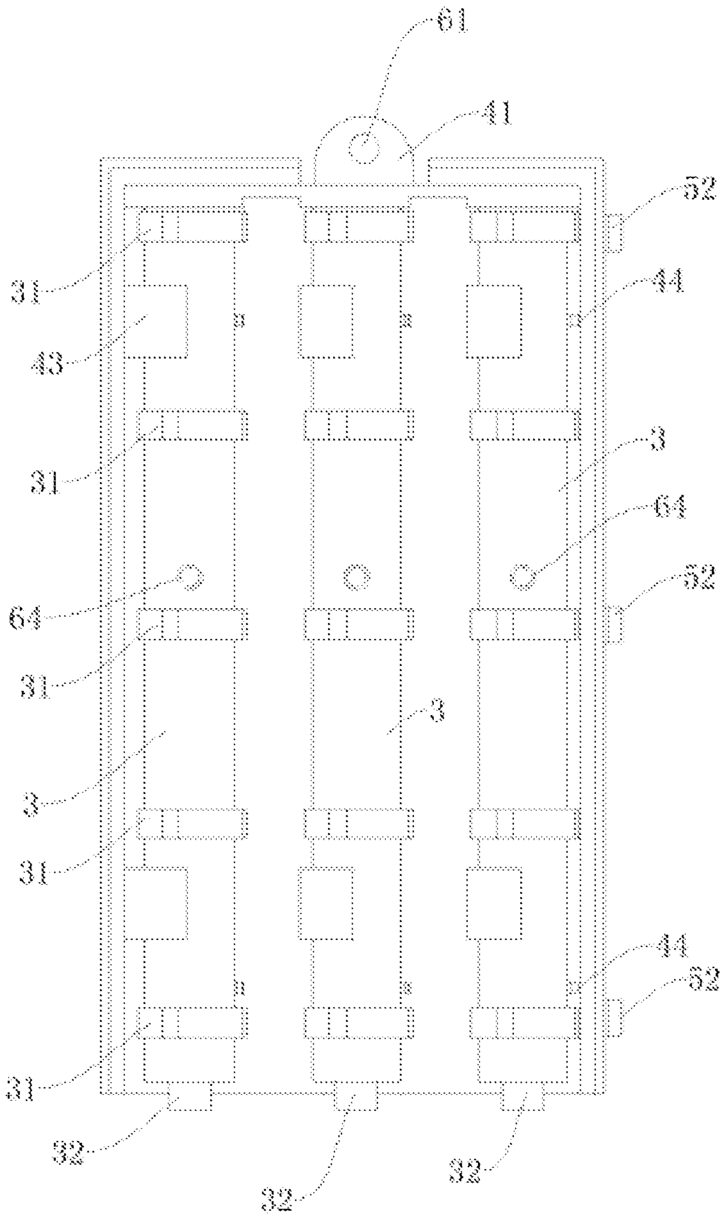
FIG. 3 is a schematic assembly view of a power supply element and a fixation base according to an embodiment of the present disclosure.
Figure 4:
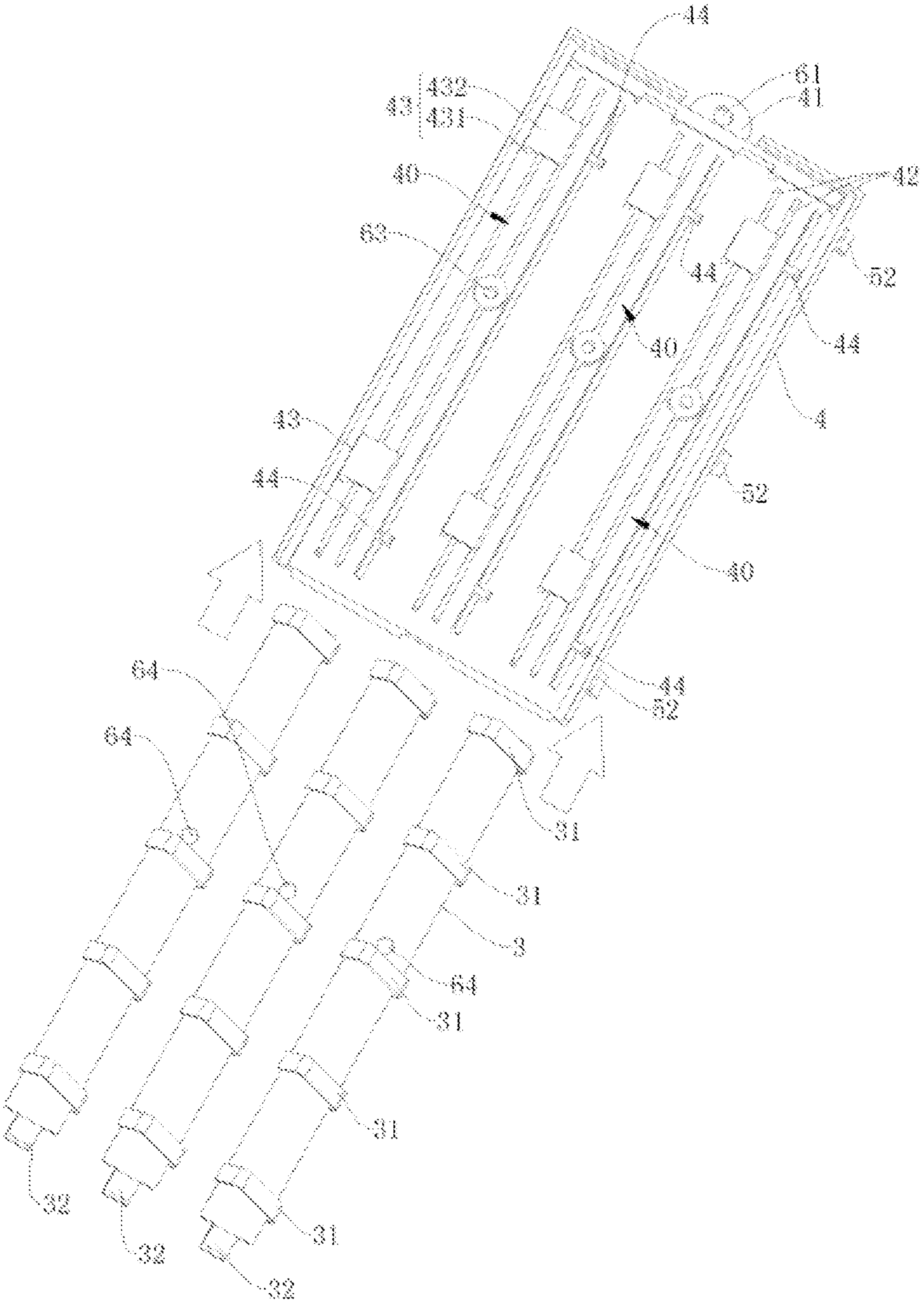
FIG. 4 is an exploded view of a power supply element and a fixation base according to an embodiment of the present disclosure.

According to some embodiments of the present disclosure, each power supply element 3 has a plurality of elastic sheets that are elastically deformable. The plurality of elastic sheets 31 are formed as the plurality of power supply contacts 31. As illustrated in FIG. 2 to FIG. 4, the plurality of elastic sheets may be arranged at intervals in a length direction of the power supply element 3 (for example, an up-down direction in FIG. 1).

For example, referring to FIG. 2 to FIG. 4, each of the plurality of power supply elements 3 is provided with five elastic sheets. It can be understood that the number of the elastic sheets may be adjusted as desired, which is not limited in the present disclosure. For example, in some embodiments of the present disclosure, the number of the elastic sheets may be equal to the number of mounting positions of the filter module 2 in the accommodation cavity 11. In this way, no matter which mounting position the filter module 2 is mounted, the electrical connectors 21 can be brought into contact with the power supply contacts 31 on the power supply element 3, to supply power to the filter module 2.

In some embodiments, when the electrical connector 21 is in contact with the elastic sheet, the elastic sheet is elastically deformable. At this time, the elastic sheet has a tendency to restore the deformation, which enables the elastic sheet to be tightly attached to the electrical connector 21, to ensure that the elastic sheet may be in close contact with the electrical connector 21. Therefore, it is possible to facilitate elimination of potential electrical safety hazards. When the electrical connector 21 is separated from the power supply contact 31, the deformation of the elastic sheet may be restored. Therefore, by arranging the elastically deformable elastic sheet on the power supply element 3, the electrical connector 21 can be brought into close contact with the power supply element 3. Further, connection stability and safety between the electrical connector 21 and the power supply element 3 can be enhanced. In addition, it is convenient to eliminate the potential electrical safety hazards and increase filtering performance of the filter module 2.

In some embodiments of the present disclosure, each of the plurality of elastic sheets includes a connection member 311 and an elastic member 312. The connection member 311 is connected to the power supply element 3. The elastic member 312 is connected to the connection member 311.

Figure 2A:
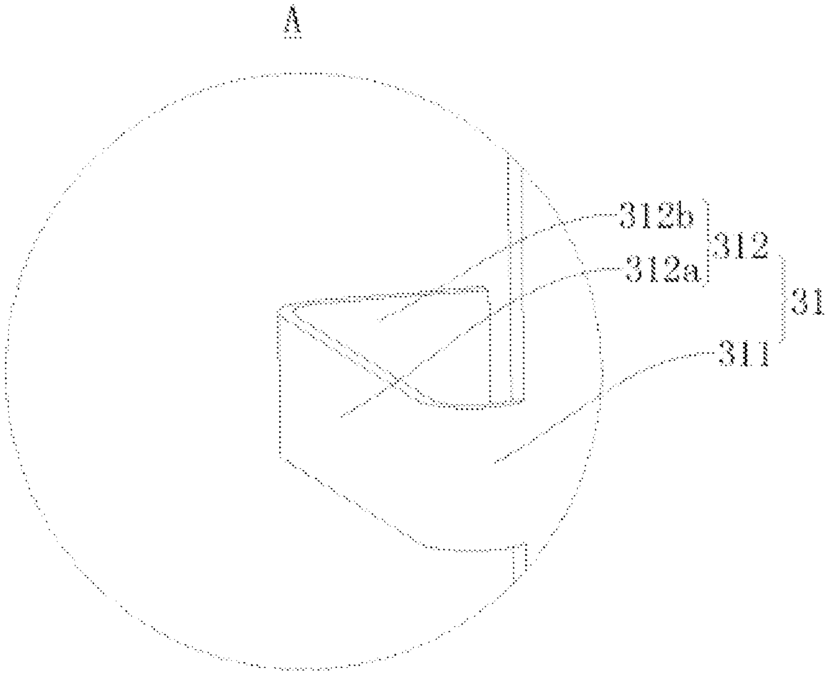
FIG. 2*a* is an enlarged view of portion A shown in FIG. 2.

Referring to FIG. 2 and FIG. 2*a*, an end of the connection member 311 may be connected to a side edge of the power supply element 3 in a width direction of the power supply element 3 (for example, the front-rear direction in FIG. 1). The elastic member 312 includes a first elastic section 312*a* and a second elastic section 312*b*. The first elastic section 312*a* has an end connected to the connection member 311 and the other end extending away from the power supply element 3. The second elastic section 312*b* has an end connected to the other end of the first elastic section 312*a* and the other end extending towards the power supply element 3. Further, the other end of the second elastic section 312*b* is spaced apart from the power supply element 3.

Therefore, by forming the elastic member 312 to include the first elastic section 312*a* and the second elastic section 312*b* and spacing the other end of the second elastic section 312*b* apart from the power supply element 3, an elastic deformation capability of the elastic member 312 can be improved, which enables the electrical connector 21 to be in close contact with the power supply element 3 and enhances connection stability and safety between the electrical connector 21 and the power supply element 3. Further, it is possible to eliminate the potential electrical safety hazards and enhance the filtering performance of the filter module 2.

As illustrated in FIG. 2*a*, the elastic member 312 may be formed in a substantial V shape. In some embodiments, a smooth transition is formed between the first elastic section 312*a* and the second elastic section 312*b*. In this way, a contact area between the elastic sheet and the electrical connector 21 can be increased. In addition, the connection reliability between the power supply element 3 and the electrical connector 21 can further improved.

Further, a smooth transition is formed between the connection member 311 and the first elastic section 312*a*. Therefore, it is possible to reduce a stress between the connection member 311 and the first elastic section 312*a* and prevent the elastic sheet from being damaged due to stress concentration. Further, reliability of the elastic sheet can be effectively improved to prolong service life of the elastic sheet.

In some optional embodiments of the present disclosure, the elastic sheet and the power supply element 3 are integrally formed. Therefore, it is possible to simplify a processing technology of the power supply element 3 and reduce processing costs. In addition, an overall structural strength of the power supply element 3 can be enhanced.

In some embodiments of the present disclosure, the elastic sheet is a stainless steel nickel-plated elastic sheet. Therefore, electrically conductive performance and wear-resisting property of the elastic sheet can be improved.

Figure 5:
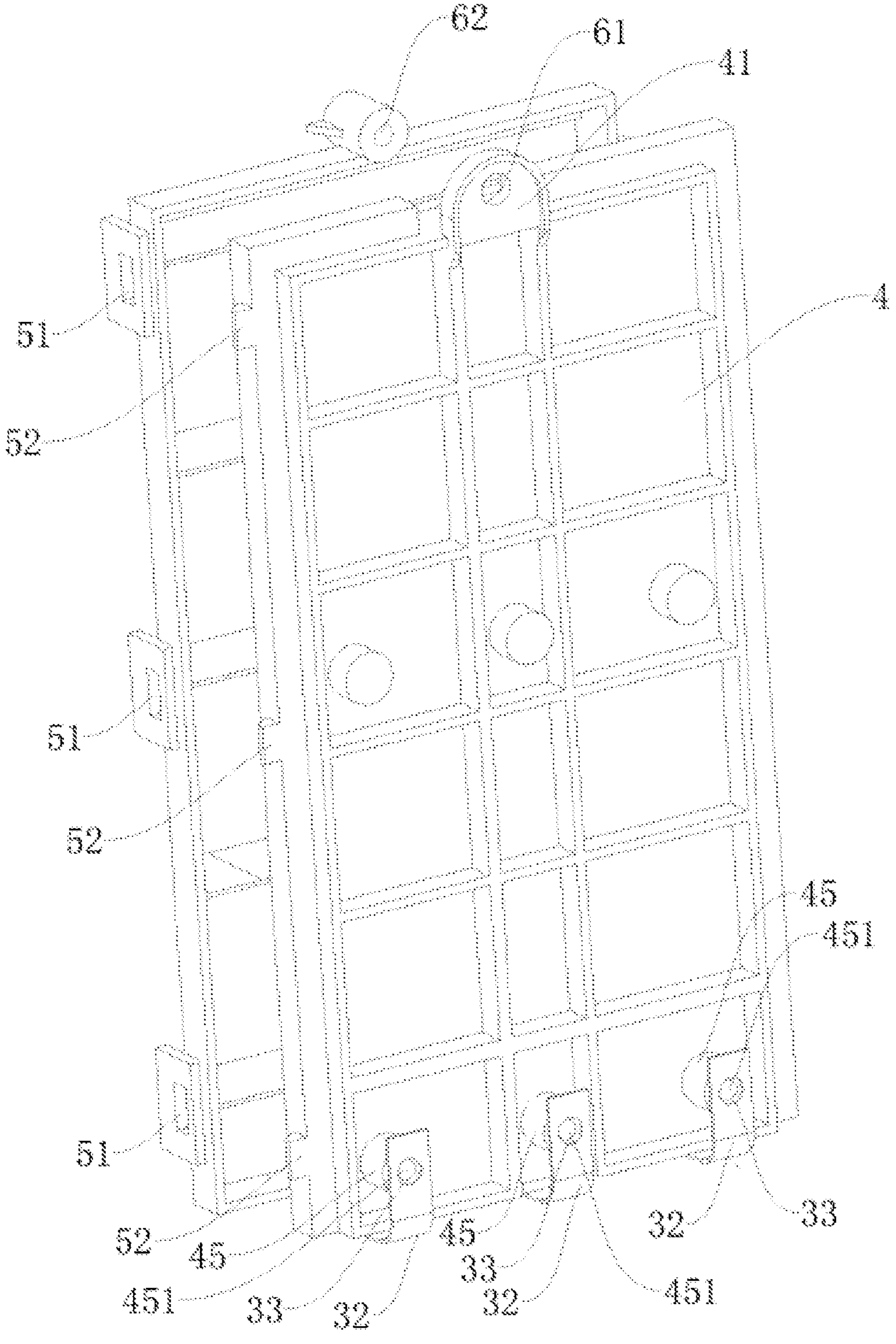
FIG. 5 is an exploded view of a partial structure of a fixation base and a housing according to an embodiment of the present disclosure.
Figure 6:
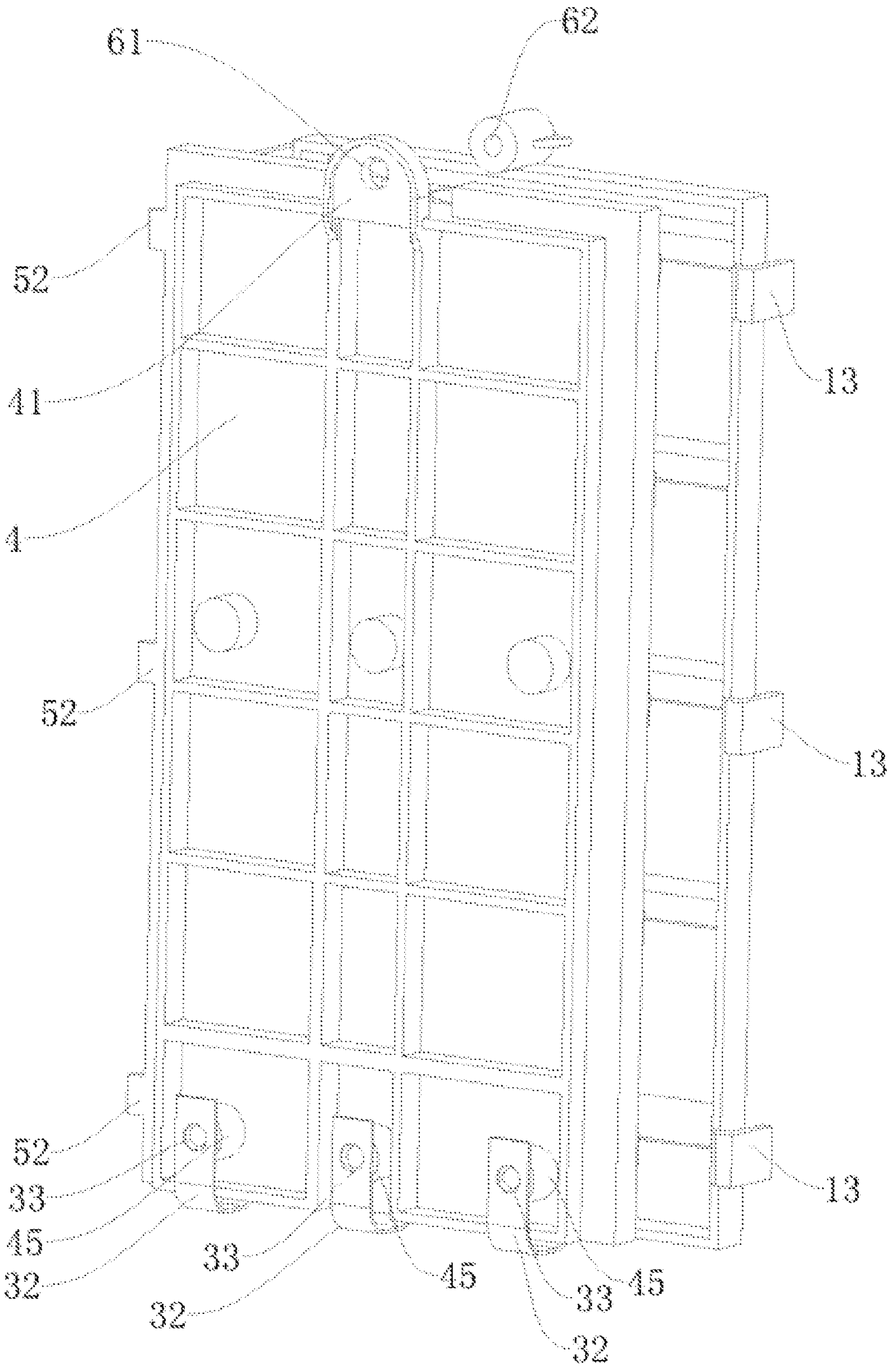
FIG. 6 is another exploded view of a partial structure of a fixation base and a housing according to an embodiment of the present disclosure.

According to some embodiments of the present disclosure, the air purification device 100 further includes a fixation base 4. The power supply elements 3 are disposed at the fixation base 4, and the fixation base 4 is connected to the housing 1. In some embodiments, during assembly, the plurality of power supply elements 3 may be first mounted on the fixation base 4, and then the fixation base 4 is connected to the housing 1. As illustrated in FIG. 5 and FIG. 6, the fixation base 4 is substantially formed into a rectangular structure, and the plurality of power supply elements 3 may be arranged at intervals in a width direction of the fixation base 4. Therefore, by providing the fixation base 4, the power supply element 3 may be conveniently fixed. In addition, the power supply elements 3 can be conveniently assembled on the housing 1 by the fixation base 4. In this way, assembly difficulty is lowered, and assembly efficiency is increased.

In some embodiments of the present disclosure, the air purification device 100 further includes a first screw (not shown). A first electrical connection member 32 is disposed at each of the plurality of power supply elements 3 and may be electrically connected to a power supply such as a main control board. As illustrated in FIG. 2, the first electrical connection member 32 is disposed at an end of the power supply element 3 in the length direction of the power supply element 3 (for example, a lower end of the power supply element 3 in FIG. 1). In addition, the first electrical connection member 32 may be formed by bending the end of the power supply element 3 in the length direction of the power supply element 3 towards the other end of the power supply element 3 in the length direction of the power supply element 3.

In some embodiments, a first connection hole 33 is formed at the first electrical connection member 32. A second connection hole 451 is formed at the fixation base 4 and corresponds to the first connection hole 33. The first screw may pass through the first connection hole 33 and the second connection hole 451. A wire harness electrically connected to the power supply is connected between the first screw and the first electrical connection member 32.

For example, in an example of FIG. 5 and FIG. 6, a first connection post 45 is provided at a side surface of the fixation base 4 facing away from the power supply element 3. A second connection hole 451 is formed at the first connection post 45. The wire harness electrically connected to the power supply is pressed between a head of the first screw and the first electrical connection member 32. Therefore, an electrical connection between the power supply element 3 and the power supply can be conveniently realized. Further, more stable electrical connection between the power supply element 3 and the power supply can be realized.

For example, in some specific embodiments of the present disclosure, a first metal ring is provided at an end portion of the wire harness electrically connected to the power supply. The first screw may sequentially pass through the first metal ring, the first connection hole 33, and the second connection hole 451 from outside to inside, to press the first metal ring tightly between the head of the first screw and the first connection member 32. Therefore, stability of the electrical connection between the power supply element 3 and the power supply can be further improved.

According to some embodiments of the present disclosure, the fixation base 4 is connected to the housing 1 by a first fastener and/or a snap. In some embodiments, the fixation base 4 may be connected to the housing 1 by one or more first fasteners, one or more snaps 13, or one or more first fasteners and one or more snaps 13. In some embodiments, the first fastener is a screw or a bolt.

For example, referring to FIG. 5 and FIG. 6, the fixation base 4 may be connected to the housing 1 by one first fastener and a plurality of snaps 13. In some embodiments, a fixation lug 41 may be provided at an end of the fixation base 4 in a length direction of the fixation base 4 (such as the up-down direction in FIG. 1). A first screw hole 61 is formed at the fixation lug 41. A second screw hole 62 is formed at the housing 1 and corresponds to the first screw. A plurality of snaps 13 may be provided at the housing 1, and an edge of the fixation base 4 may be in snap fit with the snaps 13. As illustrated in FIG. 6, the plurality of snaps 13 may be arranged at intervals in the length direction of the fixation base 4. During assembly, the edge of the fixation base 4 may be in snap fit with the snap 13, then the first fastener sequentially passes through the first screw hole 61 and the second screw hole 62, and finally the fixation base 4 is locked at the housing 1 by the first fastener.

Therefore, the snap 13 is in snap fit with the first fastener, which not only firmly connects the fixation base 4 to the housing 1, but also improves the assembly efficiency and saves assembly time.

In other embodiments of the present disclosure, when the fixation base 4 is connected to the housing 1 only by the first fastener, a plurality of first fasteners may be provided. For example, the fixation base 4 may be connected to the housing 1 by 2 to 4 first fasteners. In yet another embodiment of the present disclosure, when the fixation base 4 is connected to the housing 1 only by the snap 13, snaps 13 in two rows may be provided at the housing 1, enabling two side edges of the fixation base 4 in the width direction of the fixation base 4 are in snap fit with the snap 13, respectively. Therefore, the fixation base 4 can also be securely connected to the housing 1.

According to some embodiments of the present disclosure, the air purification device 100 further includes a positioning assembly. The positioning assembly includes a positioning hole 51 and a positioning member 52 engaged in the positioning hole 51. The positioning hole 51 is formed at one of the fixation base 4 and the housing 1, and the positioning member 52 is disposed at the other of the fixation base 4 and the housing 1. In some embodiments, when the positioning hole 51 is formed at the fixation base 4, the positioning member 52 is disposed at the housing 1. When the positioning hole 51 is formed at the housing 1, the positioning member 52 is formed at the fixation base 4. Therefore, during the assembly, the fixation base 4 may be pre-positioned by engaging the positioning member 52 into the positioning hole 51, and then the edge of the fixation base 4 is in snap fit with the snaps 13. Then, the first fastener passes through the first screw hole 61 and the second screw hole 62 sequentially, and finally the fixation base 4 is locked at the housing 1 by the first fastener. Therefore, the assembly difficulty can be further reduced, and the assembly efficiency can be improved.

For example, referring to FIG. 5 and FIG. 6, the positioning hole 51 is formed at the housing 1, and the positioning member 52 is disposed at the fixation base 4. A plurality of positioning members 52 may be provided and is arranged at a side of the fixation base 4 in the width direction of the fixation base 4 (for example, a left side of the fixation base 4 in FIG. 1), and the other side edge of the fixation base 4 in the width direction of the fixation base 4 (for example, a right side of the fixation base 4 in FIG. 1) is in snap fit with the snap 13. Therefore, the stress of the fixation base 4 may be more uniform, and the fixation base 4 is positioned more stably. Further, a deformation probability of the fixation base 4 can be reduced.

According to some embodiments of the present disclosure, the fixation base 4 may have a plurality of fixation positions 40 having a one-to-one correspondence with the plurality of power supply elements 3. The plurality of power supply elements 3 may be disposed at the plurality of fixation positions 40. As illustrated in FIG. 3 and FIG. 4, the fixation base 4 is generally formed into a rectangular plate-shaped structure, and the plurality of fixation positions 40 is arranged at intervals in the width direction of the fixation base 4. Therefore, the power supply element 3 is conveniently positioned, and the assembly difficulty of the power supply element 3 is lowered. In addition, it is possible to facilitate improving the assembly efficiency.

In some embodiments of the present disclosure, a plurality of support ribs 42 is provided at the fixation positions 40 and is arranged at intervals. The power supply element 3 may be supported on the support ribs 42. For example, each of the plurality of support ribs 42 may extend in the length direction of the fixation base 4. The plurality of support ribs 42 may be arranged at intervals in the width direction of the fixation base 4. It should be understood that in other embodiments of the present disclosure, each of the plurality of the support ribs 42 may also extend in the width direction of the fixation base 4. In this case, the plurality of support ribs 42 may be arranged at intervals in the length direction of the fixation base 4. Therefore, the power supply element 3 may be spaced apart from a surface of the fixation base 4 by the support rib 42, which is convenient for assembly personnel to grab the power supply element 3. Therefore, it is convenient for the assembly personnel to adjust the position of the power supply element 3 and to disassemble the power supply element 3.

According to some embodiments of the present disclosure, a plurality of limiting stop sheets 43 are provided at each of the plurality of fixation positions 40. The plurality of limiting stop sheets 43 may be arranged at intervals in a length direction of the fixation position 40. A limiting space is formed between each of the plurality of limiting stop sheets 43 and the fixation base 4, and the power supply element 3 is disposed in the limiting space.

As illustrated in FIG. 3 and FIG. 4, the plurality of limiting stop sheets 43 may be disposed at a side of the fixation position 40 in a width direction of the fixation position 40. During assembly, the power supply element 3 may be inserted into the limiting space in a direction shown by an arrow in FIG. 4. The number of the limiting stop sheets 43 may be adjusted as desired. For example, in the example shown in FIG. 3, two limiting stop sheets 43 are provided. Further, one of the two limiting stop sheets 43 is arranged close to an end of the fixation position 40 in the length direction of the fixation position 40, and the other of the two limiting stop sheets 43 is arranged close to the other end of the fixation position 40 in the length direction of the fixation position 40. Therefore, by providing the plurality of limiting stop sheets 43 on the fixation position 40, a position of the power supply element 3 can be limited by the limiting stop sheet 43. Therefore, it is possible to prevent the power supply element 3 from moving during the assembly, which facilitates improving the assembly efficiency.

According to some embodiments of the present disclosure, each of the plurality of limiting stop sheets 43 includes a first stop member 431 and a second stop member 432. The first stop member 431 is connected to the fixation base 4, and the second stop member 432 is connected to the first stop member 431. In some embodiments, the first stop member 431 may be located at a side of the power supply element 3 in a width direction of the power supply element 3, and the second stop member 432 is opposite to a side surface of the power supply element 3 in a thickness direction of the power supply element 3.

As illustrated in FIG. 4, the first stop member 431 has an end connected to the fixation base 4. The first stop member 431 may be substantially perpendicular to the fixation base 4. For example, an angle between the first stop member 431 and the fixation base 4 may be 80° to 120°. The second stop member 432 is connected to an end of the first stop member 431 away from the fixation base 4. The second stop member 432 may be substantially parallel to the fixation base 4. The limiting stop sheet 43 may be generally formed into an L shape. When the power supply element 3 moves, the first stop member 431 may abut against a side of the power supply element 3 in the width direction of the power supply element 3 to limit the position of the power supply element 3. The second stop member 432 may abut against a side of the power supply element 3 in the thickness direction of the power supply element 3 to limit the position of the power supply element 3.

Therefore, the first stop member 431 can limit the position of the power supply element 3 in the width direction of the power supply element 3, and the second stop member 432 can limit the position of the power supply element 3 in the thickness direction of the power supply element 3. Therefore, the position of the power supply element 3 can be effectively limited by the limiting stop sheet 43. Further, the limiting stop sheet 43 is simple in structure and convenient to be machined.

In some optional embodiments of the present disclosure, the limiting stop sheets 43 and the fixation base 4 are integrally formed. For example, the limiting stop sheets 43 and the fixation base 4 are integrally formed through injection molding. Therefore, it is possible to enhance a connection strength between the limiting stop sheets 43 and the fixation base 4 and simplify the processing technology of the fixation base 4. In addition, processing efficiency can be improved, and processing costs can be lowered.

According to some embodiments of the present disclosure, a plurality of limit members 44 is provided at the plurality of fixation positions 40. The plurality of limit members 44 is arranged at intervals in the length direction of the fixation position 40. The plurality of limit members 44 and the first stop member 431 are located at two sides of each of the fixation position 40 in a width direction of the fixation position 40, respectively.

Since the plurality of limit members 44 and the first stop member 431 are respectively disposed at the two sides of the fixation position 40 in the width direction of the fixation position 40, when the power supply element 3 moves, the first stop member 431 can abut against the side of the power supply element 3 in the width direction of the power supply element 3, and the limit member 44 can abut against the other side of the power supply element 3 in the width direction of the power supply element 3. Therefore, the position of the power supply element 3 can be limited at the two sides thereof in the width direction of the power supply element 3 by the limit member 44 and the first stop member 431.

It can be understood that a specific number of the limit members 44 may be adjusted and designed based on an actual length of the power supply element 3. For example, referring to FIG. 3 and FIG. 4, two limit members 44 are provided. One of the two limit members 44 is disposed close to the end of the fixation position 40 in the length direction of the fixation position 40, and the other of the two limit members 44 is disposed close to the other end of the fixation position 40 in the length direction of the fixation position 40. The limit member 44 may be opposite to the limiting stop sheet 43, or may be staggered from the limiting stop sheet 43. Therefore, by providing the plurality of limit members 44 on the fixation position 40, the position of the power supply element 3 can be limited by the limit member 44, which avoids movement of the power supply element 3 during the assembly and facilitates the improvement of the assembly efficiency.

In some optional embodiments of the present disclosure, the limit member 44 and the fixation base 4 are integrally formed. For example, the limit member 44 and the fixation base 4 are integrally formed through injection molding. Therefore, the processing technology of the fixation base 4 can be further simplified, and the processing efficiency can be improved. In addition, the processing cost can be reduced.

According to some embodiments of the present disclosure, the power supply element 3 may be locked at the fixation base 4 by a second fastener. In some embodiments, the second fastener may be a screw, a bolt, or the like. In some embodiments, in an example of FIG. 4, the power supply element 3 is locked at the fixation base 4 by one second fastener. In addition, a third screw hole 63 is formed at the fixation base 4, and a fourth screw hole 64 is formed at the power supply element 3. The second fastener sequentially passes through the fourth screw hole 64 and the third screw hole 63 to lock the power supply element 3 on the fixation base 4. The structure is simple, and the connection is reliable.

Figure 7:
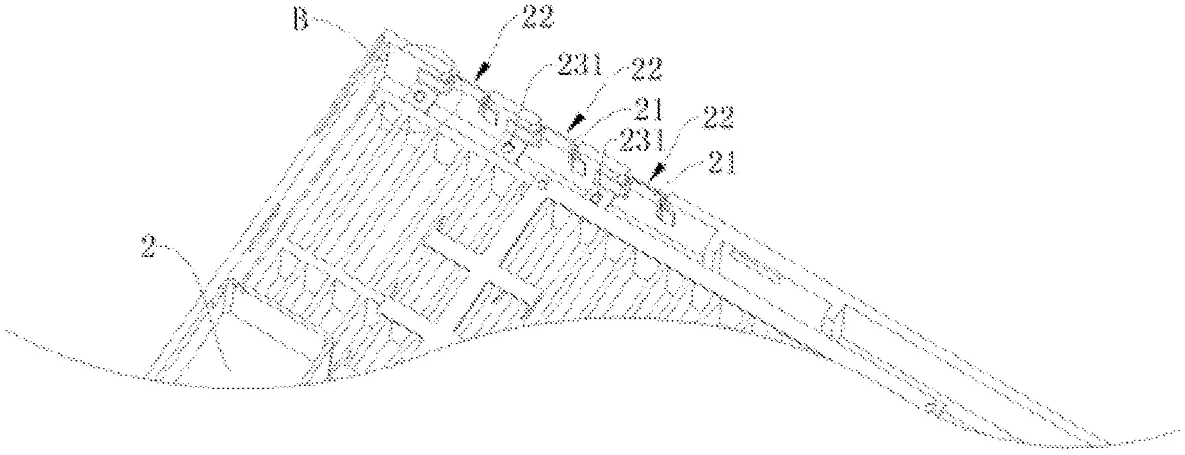
FIG. 7 is a schematic view of an internal structure of a filter module according to an embodiment of the present disclosure.
Figure 7A:
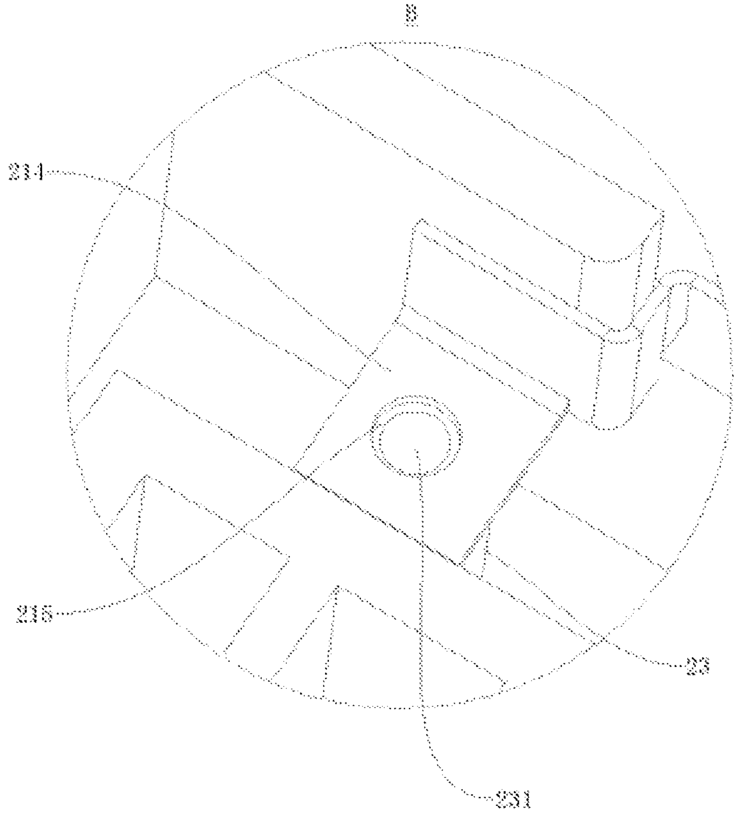
FIG. 7*a* is an enlarged view of portion B shown in FIG. 7.

According to some embodiments of the present disclosure, the filter module 2 has a mounting hole 22 formed at a side wall of the filter module 2. The mounting hole 22 may be formed into a through hole. The electrical connectors 21 is disposed in the mounting hole 22. Referring to FIG. 7, a plurality of mounting holes 22 is provided. The plurality of mounting holes 22 have a one-to-one correspondence with the plurality of electrical connectors 21. The plurality of mounting holes 22 is arranged at intervals in the length direction of the side wall of the filter module 2.

Figure 8:
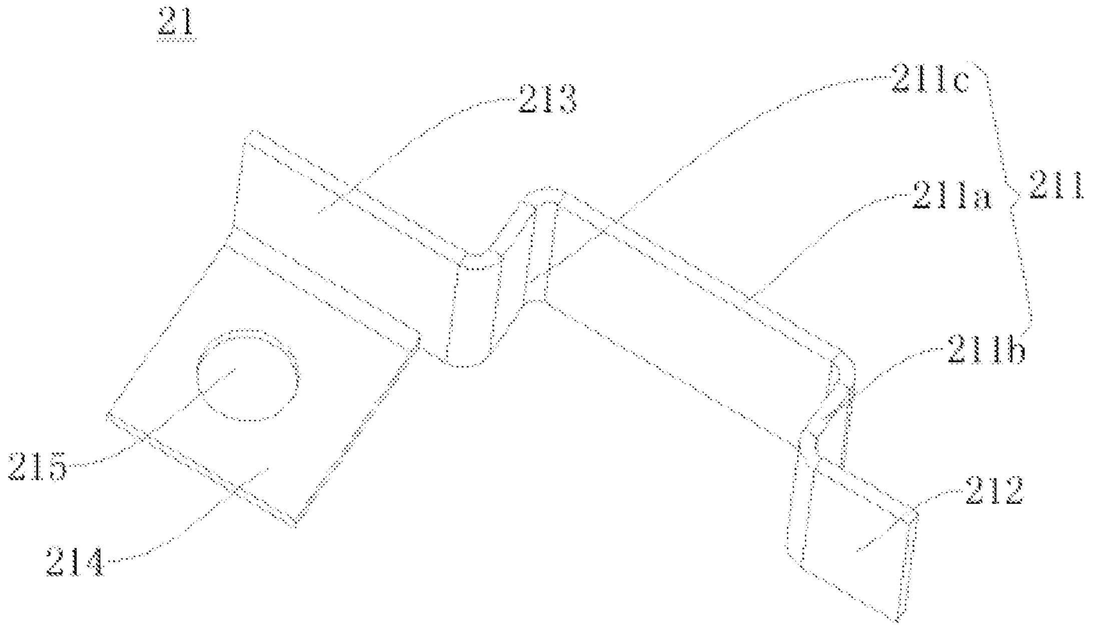
FIG. 8 is a perspective view of an electrical connector according to an embodiment of the present disclosure.
Figure 9:
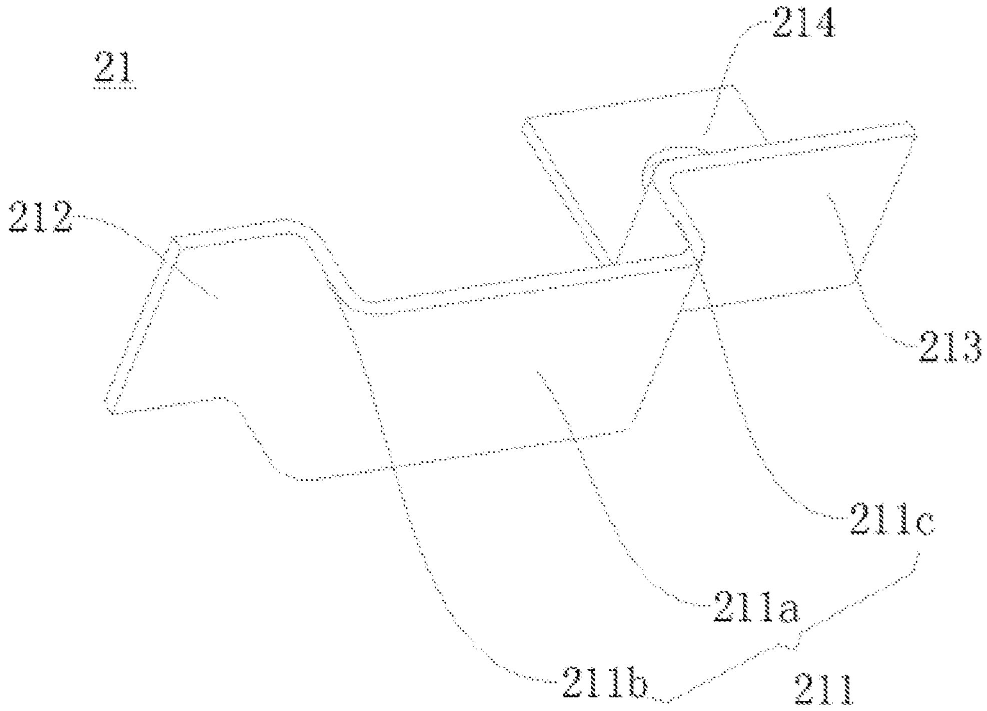
FIG. 9 is another perspective view of an electrical connector according to an embodiment of the present disclosure.
Figure 10:
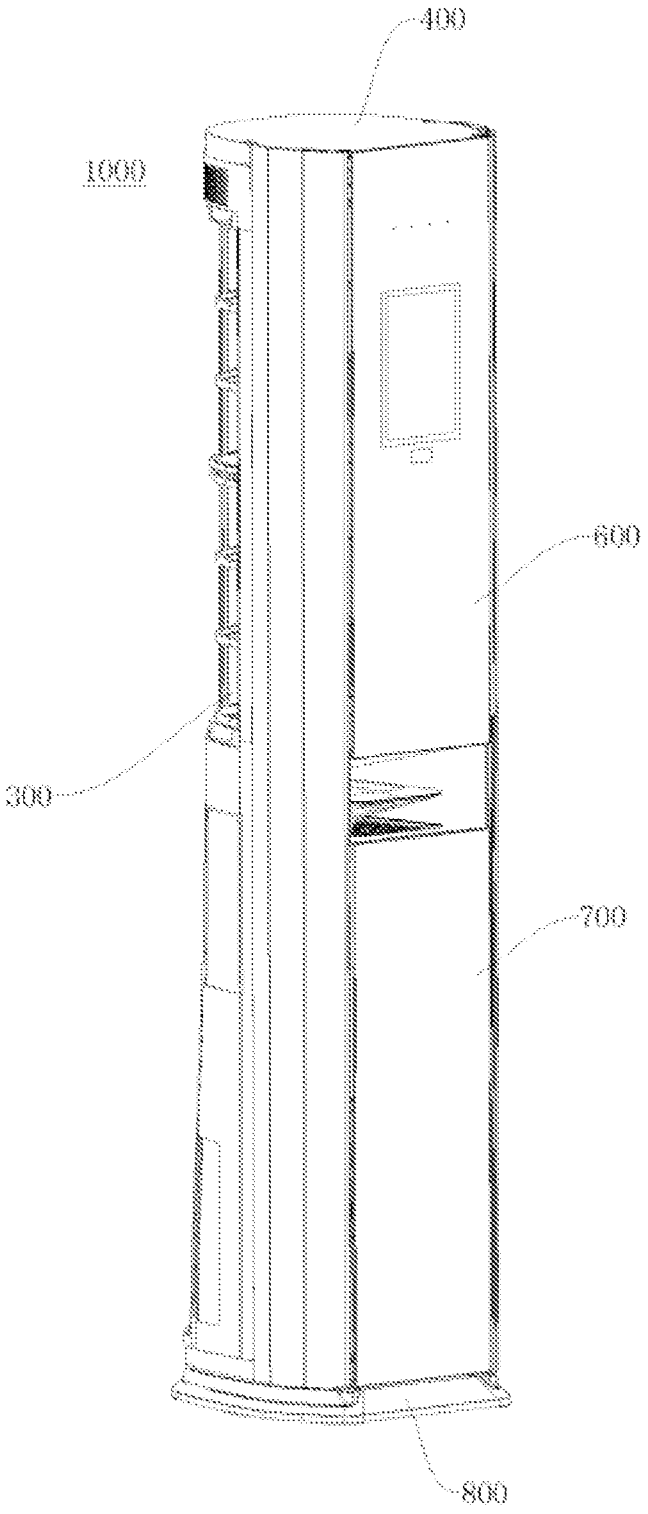
FIG. 10 is a perspective view of an air conditioner according to an embodiment of the present disclosure.

In some embodiments, the electrical connector 21 includes a protrusion 211 and a first limit arm 212 and a second limit arm 213 that are connected to two ends of the protrusion 211. The protrusion 211 is opposite to the mounting hole 22. Referring to FIG. 8 and FIG. 9, the protrusion 211 includes a body 211*a*, and a first connection section 211*b* and a second connection section 211*c* that are respectively arranged at two sides of the body 211*a* and opposite to each other. The body 211*a* is adapted to be in contact with the electrical connector 21. The first connection section 211*b* may be connected to the first connection arm, and the second connection section 211*c* may be connected to the second connection arm. In some embodiments, the first connection segment 211*b* and the second connection segment 211*c* are both perpendicular to the body 211*a*.

In some embodiments of the present disclosure, the electrical connector 21 is a stainless steel nickel-plated piece. Therefore, it is possible to enhance electrically conductive performance and wear-resisting performance of the electrical connector 21.

The first limit arm 212 and the second limit arm 213 are adapted to abut against an inner wall surface of the side wall of the filter module 2. As illustrated in FIG. 7, the first limit arm 212 and the second limit arm 213 are both located on an inner side of the side wall of the filter module 2. When the electrical connector 21 moves, the first limit arm 212 and the second limit arm 213 can abut against the inner wall surface of the side wall of the filter module 2, respectively. In this way, it is possible to prevent the electrical connector 21 from being disengaged from the mounting hole 22. In addition, position stability of the electrical connector 21 can be improved.

Further, the air purification device further includes a second screw (not shown). A second electrical connection member 214 is disposed at each of the plurality of electrical connectors 21. The second electrical connection member 214 may be electrically connected to an internal circuit of the filter module 2. As illustrated in FIG. 8 and FIG. 9, the second electrical connection member 214 may be disposed at a side of the first connection arm away from the protrusion 211 or a side of the second connection arm away from the protrusion 211.

In some embodiments, the second electrical connection member 214 may have a third connection hole 215. A fourth connection hole 231 is formed at the filter module 2 and corresponds to the third connection hole 215. For example, with reference to FIG. 8, a second connection post 23 may be provided in the filter module 2. A fourth connection hole 231 is formed in the second connection post 23. The wire harness electrically connected to the internal circuit of the filter module 2 may be pressed between a head of the second screw and the second electrical connection member 214. Therefore, an electrical connection between the electrical connector 21 and the internal circuit of the filter module 2 can be conveniently realized. Further, the connection between the electrical connector 21 and the internal circuit of the filter module 2 is more stable. For example, in some embodiments of the present disclosure, a second metal ring is provided at the end portion of the wire harness electrically connected to the internal circuit of the filter module 2. The second screw may sequentially pass through the second metal ring, the third connection hole 215, and the fourth connection hole 231 from outside to inside, to press the second metal ring between the head of the first screw and the second electrical connection member 214. Therefore, stability of the electrical connection between the electrical connector 21 and the internal circuit of the filter module 2 can be further improved.

An air conditioner 1000 according to a second aspect of the present disclosure includes the air purification device 100 according to the first aspect of the present disclosure.

In the air conditioner 1000 according to the second aspect of the embodiments of the present disclosure, by providing the air purification device 100 according to the first aspect of the embodiments of the present disclosure, the plurality of power supply contacts 31 is provided at each of the plurality of power supply elements 3. In this way, each of the plurality of electrical connectors 31 is brought into contact with any one of the power supply contacts 31 on the respective power supply element 3. As a result, the electrical connection between the power supply element 3 and the electrical connector 21 can be realized. Therefore, it is possible to allow for diversified mounting position of the filter module 2 and enhance the mounting flexibility of the filter module 2. Further, the optimization of the internal structure of each of the air purification device 100 and the air conditioner 1000 having the air purification device 100 are facilitated. In addition, the wire harness can be removed, and the wiring complexity is reduced. Further, the later maintenance costs can be lowered.

In some embodiments of the present disclosure, the air conditioner 1000 may include a fresh air component 200, and the air purification device 100 may be disposed in the fresh air component 200. The fresh air component 200 further includes a first fan assembly 201. The first fan assembly 201 may be disposed below the air purification device 100. It can be understood that when the first fan assembly 201 operates, outdoor fresh air and/or indoor stale air may be introduced into the fresh air component 200, and is discharged to an outdoor space after purified by the air purification device 100. Therefore, it is possible to achieve an air purification treatment and improve cleanliness of the fresh air introduced into an indoor space or cleanliness of an indoor air.

In some embodiments, the air conditioner may further include an air heat exchanger 900. It should be noted that a specific type of the air conditioner according to the embodiments of the present disclosure is not limited. In some implementations of the present disclosure, the air conditioner may be a split air conditioner or an all-in-one air conditioner. The split air conditioner may include an indoor unit and an outdoor unit. Both the air heat exchanger 900 and the fresh air component 200 may be disposed in the indoor unit. The all-in-one air conditioner may be a mobile air conditioner or a window air conditioner. It should be noted that an arrangement position of the fresh air component 200 on the air conditioner is not limited. For example, in some embodiments of the present disclosure, when the fresh air component 200 is applied in a cabinet indoor unit, the fresh air component 200 may be disposed at a lower side of a body of the cabinet indoor unit.

In some embodiments of the present disclosure, the air conditioner may further include a casing component. The air heat exchanger 900 and the fresh air component 200 are both accommodated in the casing component.

Figure 11:
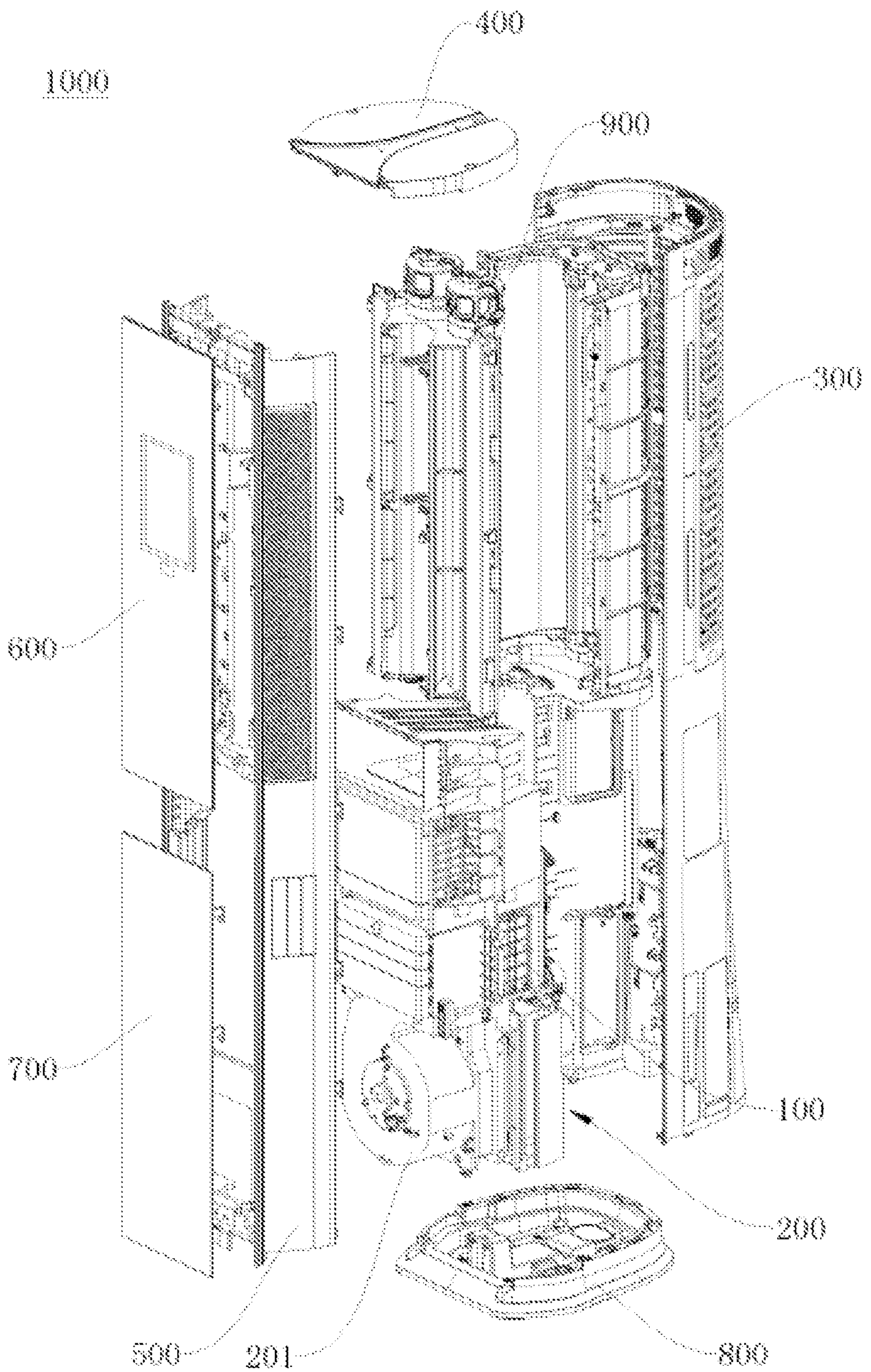
FIG. 11 is an exploded view of an air conditioner according to an embodiment of the present disclosure.

In some embodiments of the present disclosure, it should be noted that specific composition of the casing component according to the embodiments of the present disclosure is not limited, and may be constructed as desired. For example, in an example illustrated in FIG. 11, the casing component may include a rear enclosing panel 300, a top cover 400, an air outlet frame 500, an upper panel 600, a lower panel 700, a base 800, and the like. The rear enclosing plate 300 is composed of one or more pieces, and has an air conditioning air return inlet. An air conditioning air return grille and a filter are provided at the air conditioning air return inlet. A post is provided at each of two sides in a rear casing and configured to mount and fix the air heat exchanger 900, the fresh air component 200, and an electric control component. The air heat exchanger 900 may include a heat exchanger, a single cross flow fan, a double cross flow fan, and the like.

Other arrangements of the air conditioner according to the embodiments of the present disclosure, such as an electrical control box, are known to those of ordinary skill in the art, and the description thereof in detail will be omitted herein.

In addition, terms such as "a first feature" and "a second feature" may include one or more of this feature. In the description of the present disclosure, a structure in which a first feature is "on" or "below" a second feature may include an embodiment in which the first feature is in direct contact with the second feature, and may also include an embodiment in which the first feature and the second feature are not in direct contact with each other, but are in contact via an additional feature formed therebetween. Furthermore, a first feature "on," "above," or "on top of" a second feature may include an embodiment in which the first feature is orthogonally or obliquely "on," "above," or "on top of" the second feature, or just means that the first feature is at a height higher than that of the second feature.

In the description of this specification, descriptions with reference to the terms "an embodiment," "some embodiments," "illustrative embodiments," "examples," "specific examples," or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. In addition, the described specific features, structures, materials or characteristics may be combined in any one or more embodiments or examples in a suitable manner.

Although embodiments of the present disclosure have been illustrated and described, it is conceivable for those skilled in the art that various changes, modifications, replacements, and variations can be made to these embodiments without departing from the principles and spirit of the present disclosure. The scope of the present disclosure shall be defined by the claims as appended and their equivalents.

What is claimed is:

1. An air purification device comprising:

a housing having an accommodation cavity;

a filter module disposed within the accommodation cavity, the filter module being provided with a plurality of electrical connectors arranged at intervals in a first direction; and a plurality of power supply elements arranged at intervals at the housing in the first direction and having a one-to-one correspondence with the plurality of electrical connectors, each of the plurality of power supply elements being provided with a plurality of power supply contacts configured to be in contact with one corresponding electrical connector;

wherein the plurality of power supply contacts of one power supply element of a plurality of power supply elements are arranged at intervals along a second direction perpendicular to the first direction, and all of the plurality of power supply contacts of the one power supply element protrude from the one power supply element toward a same direction.

2. The air purification device according to claim 1, wherein each of the plurality of power supply contacts is an elastic sheet that is elastically deformable.

3. The air purification device according to claim 2, wherein each of the plurality of power supply contacts includes:

a connection member connected to the power supply element; and an elastic member connected to the connection member and including a first elastic section and a second elastic section, the first elastic section having an end connected to the connection member and another end extending away from the power supply element, and the second elastic section having an end connected to the other end of the first elastic section and another end extending towards the power supply element, and the other end of the second elastic section being spaced apart from the power supply element.

4. The air purification device according to claim 1, further comprising:

a fixation base connected to the housing;

wherein the plurality of power supply elements are disposed at the fixation base.

5. The air purification device according to claim 4, wherein the fixation base is connected to the housing by at least one of a fastener or a snap.

6. The air purification device according to claim 5, further comprising:

a positioning assembly including a positioning hole and a positioning member engaged in the positioning hole, the positioning hole being formed at one of the fixation base and the housing, and the positioning member is disposed at another of the fixation base and the housing.

7. The air purification device according to claim 4, wherein the fixation base has a plurality of fixation positions having a one-to-one correspondence with the plurality of power supply elements, and each of the plurality of power supply elements is disposed at one of the plurality of fixation positions.

8. The air purification device according to claim 7, wherein a plurality of limiting stop sheets are provided at each of the plurality of fixation positions and are arranged at intervals in a length direction of the fixation position, a limiting space being formed between each of the plurality of limiting stop sheets and the fixation base, and each of the plurality of power supply elements being disposed in one limiting space.

9. The air purification device according to claim 8, wherein each of the plurality of limiting stop sheets includes:

a first stop member connected to the fixation base and located on a side of the power supply element in a width direction of the power supply element; and a second stop member connected to the first stop member and opposite to a side surface of the power supply element in a thickness direction of the power supply element.

10. The air purification device according to claim 9, wherein a plurality of limit members is provided at the plurality of fixation positions and is arranged at intervals in the length direction of the fixation position, and the plurality of limit members and the first stop member are located at two sides of each of the plurality of fixation positions in a width direction of the fixation position, respectively.

11. The air purification device according to claim 4, further comprising:

a screw;

wherein:

an electrical connection member is disposed at one of the plurality of power supply contacts, and a first connection hole is formed at the electrical connection member;

a second connection hole is formed at the fixation base and corresponds to the first connection hole;

the screw passes through the first connection hole and the second connection hole; and a wire harness electrically connected to a power supply is connected between the screw and the electrical connection member.

12. The air purification device according to claim 4, wherein one of the plurality of power supply elements is locked at the fixation base by a fastener.

13. The air purification device according to claim 1, wherein the filter module has a mounting hole formed at a side wall of the filter module, and wherein one of the plurality of electrical connectors is disposed in the mounting hole and includes:

a protrusion opposite to the mounting hole; and a first limit arm and a second limit arm that are connected to two ends of the protrusion, the first limit arm and the second limit arm being configured to abut against an inner wall surface of the side wall of the filter module.

14. The air purification device according to claim 1, further comprising:

a screw;

wherein:

an electrical connection member is disposed at one of the plurality of electrical connectors, and a first connection hole is formed at the electrical connection member;

a second connection hole is formed at the filter module and corresponds to the first connection hole;

the screw passes through the first connection hole and the second connection hole; and a wire harness electrically connected to an internal circuit of the filter module is connected between the screw and the electrical connection member.

15. An air conditioner comprising:

the air purification device according to claim 1.

16. The air conditioner according to claim 15, wherein the air purification device further includes:

a fixation base connected to the housing;

wherein the plurality of power supply elements are disposed at the fixation base.

17. The air conditioner according to claim 16, wherein the fixation base is connected to the housing by at least one of a fastener or a snap.

18. The air conditioner according to claim 17, wherein the air purification device further includes:

a positioning assembly including a positioning hole and a positioning member engaged in the positioning hole, the positioning hole being formed at one of the fixation base and the housing, and the positioning member is disposed at another of the fixation base and the housing.

19. The air purification device according to claim 1, wherein:

the same direction is a third direction; and each of the plurality power supply elements is further provided with an electrical connection member protruding from the each of the plurality power supply elements toward a fourth direction opposite to the third direction, a first connection hole is formed in the electrical connection member, and an axis of the first connection hole is parallel to the third direction and the fourth direction.

20. An air purification device comprising:

a housing having an accommodation cavity;

a filter module disposed within the accommodation cavity, the filter module being provided with a plurality of electrical connectors arranged at intervals in a first direction; and a plurality of power supply elements arranged at intervals at the housing in the first direction and having a one-to-one correspondence with the plurality of electrical connectors, each of the plurality of power supply elements being provided with a plurality of power supply contacts protruding from the each of the plurality of power supply elements toward a second direction and configured to be in contact with one corresponding electrical connector, and an electrical connection member protruding from the each of the plurality of power supply elements toward a third direction opposite to the second direction;

wherein a first connection hole is formed in the electrical connection member, and an axis of the first connection hole is parallel to the second direction and the third direction.

* * * * *